United States Patent [19]

Tarui et al.

[11] Patent Number: 6,088,770
[45] Date of Patent: Jul. 11, 2000

[54] SHARED MEMORY MULTIPROCESSOR PERFORMING CACHE COHERENCY

[75] Inventors: Toshiaki Tarui, Sagamihara; Koichi Okazawa, Ebina; Yasuyuki Okada, Yamato; Toru Shonai, Kodaira; Toshio Okochi, Kokubunji; Hideya Akashi, Hachiouji, all of Japan

[73] Assignee: Hitachi, Ltd., Tokyo, Japan

[21] Appl. No.: 09/030,957

[22] Filed: Feb. 26, 1998

[30] Foreign Application Priority Data

Feb. 27, 1997 [JP] Japan ..................................... 9-059914

[51] Int. Cl.⁷ ..................................................... G06F 13/14
[52] U.S. Cl. .......................... 711/148; 711/141; 711/147; 711/149; 711/169
[58] Field of Search ..................................... 711/100, 113, 711/118, 119, 133, 134, 135, 141, 144, 145, 146, 147, 148, 169, 206; 364/131; 709/200, 201, 213, 218

[56] References Cited

U.S. PATENT DOCUMENTS

| | | | |
|---|---|---|---|
| 4,985,825 | 1/1991 | Webb, Jr. et al. | 711/169 |
| 5,710,907 | 1/1998 | Hagersten et al. | 711/148 |
| 5,890,189 | 3/1999 | Nozue et al. | 711/100 |
| 5,956,754 | 9/1999 | Kimmel | 711/206 |

FOREIGN PATENT DOCUMENTS

| | | |
|---|---|---|
| 8-320828 | 3/1996 | Japan . |
| 9-022381 | 1/1997 | Japan . |

OTHER PUBLICATIONS

"DDM–A Cache–Only Memory Architecture", Computer, Sep. 1992, vol. 25, issue 9, pp. 44–54.

"Cache coherent shared memory hypercube", Parallel and Distributed Processing, 1992. Proceedings of the 4th IEEE Symposium, Dec. 1–4 1992, pp. 515–520.

"Software Cachingon cache–coherent multiprocessors", Parallel and Distributed Processing, 1992. Proceedings of the 4th IEEE Symposium, Dec. 1–4 1992, pp. 521–526.

"Evolved System Architecture", Sun World, Jan. 1996, pp. 29–32.

"The Stanford Flash Multiprocessor", (The 21st Annual International Symposium on Computer Architecture, Apr. 18–21, 1994, Chicago, Illinois, pp. 302–313.

"Hive: Fault Containment for Shared–Memory Multiprocessors" (15th ACM Symposium on Operating Systems Principles, Dec. 3–6, 1995, Copper Mountain Resort, Colorado, pp. 12–25.

*Primary Examiner*—Do Hyun Yoo
*Assistant Examiner*—T. Nguyen
*Attorney, Agent, or Firm*—Beall Law Offices

[57] ABSTRACT

A shared memory multiprocessor (SMP) has efficient access to a main memory included in a particular node and a management of partitions that include the nodes. In correspondence with each page of main memory included in a node, a bit stored in a register indicates if the page has been accessed from any other node. In a case where the bit is "0", a cache coherent command to be sent to the other nodes is not transmitted. The bit is reset by software at the time of initialization and memory allocation, and it is set by hardware when the page of the main memory is accessed from any other node. In a case where the interior of an SMP is divided into partitions, the main memory of each node is divided into local and shared areas, for which respectively separate addresses can be designated. In each node, the configuration information items of the shared area and the local area are stored in registers. The command of access to the shared area is multicast to all of the nodes, whereas the command is multicast only to the nodes within the corresponding partition when the local area is accessed.

11 Claims, 10 Drawing Sheets

| ACCESS COMMAND | OUTPUTS OF DESTINATION SELECTOR | |
|---|---|---|
| | ACCESS ADDRESS | |
| | INTERNAL | REMOTE |
| F | BRANCH ACCORDING TO ACCESS ADDRESS • LOCAL AREA → MC • SHARED AREA → BC | |
| FI | | |
| I | | |
| WB | | HOME NODE |
| D, DM | ACCESS SOURCE NODE | |
| ND | | ACCESS SOURCE NODE |

SHARED MEMORY MULTIPROCESSOR PERFORMING CACHE COHERENCY

BACKGROUND OF THE INVENTION

The present invention relates to a parallel computer system of shared memory type which is used for information processors, especially personal computers (PCs), workstations (WSs), server machines, etc., and more particularly to a control method for a main memory.

In recent years, the architecture of a multiprocessor of the shared memory type (SMP) has spread to use in host models of PCs and WSs, server machines, etc. This architecture has become an important feature for the enhancement of performance in shared-memory multiprocessors that share main memory, for example among multiprocessors having a large number, such 20~30, processors.

Extensively used as a method of constructing a shared memory multiprocessor is a shared bus scheme. With the bus scheme, however, the throughput of the bus causes a bottleneck, and hence, the number of connectable processors is limited at most 8 or so. Accordingly, the bus scheme is not suitable as a method of connecting a large number of processors.

Conventional methods of constructing shared memory multiprocessors each having a large number of processors connected therein are broadly classified into two schemes.

One of them is crossbar switch architecture, and it is disclosed in, for example, "Evolved System Architecture" (Sun World, January 1996, pp. 29–32). With this scheme, boards each of which has a processor and a main memory, are connected by a high speed crossbar switch so as to maintain the cache coherency among the processors. This scheme has the merit that the cache coherency can be rapidly maintained.

The scheme, however, has the demerit that, since a transaction for maintaining the cache coherency is broadcast to all of the processors, traffics on crossbar switch is very high and causes a bottleneck in performance. Another demerit is that, since the high speed switch is required, a high cost is incurred. Further, since the transaction for maintaining the cache coherency must be broadcast, it is difficult to realize a system having a very large number of processors, and the number of processors is limited to ten to twenty.

In the ensuing description, this scheme shall be called the switch type SMP (Symmetrical MultiProcessor).

The other scheme provides a multiprocessor employing a directory based protocol, and it is disclosed in, for example, "The Stanford FLASH Multiprocessor" (The 21st Annual International Symposium on COMPUTER ARCHITECTURE, Apr. 18–21, 1994, Chicago, Ill., pp. 302–313). With this scheme, a directory, which is a bitmap indicative of those caches of processors to which the data line is cached, is provided for every data line of the main memory, whereby a transaction for maintaining the cache coherency among the processors is sent only to the pertinent processors. Thus, traffics on switch can be noticeably reduced, and the hardware cost of the switch can be curtailed.

Since, however, the contents of the directory placed in the main memory must be inevitably checked in submitting the transaction for maintaining cache coherency, the scheme has the demerit that an access latency is lengthened. Further, the scheme has the demerit that the cost of the memory for placing the directory increases additionally.

As stated above, the switch type SMP and the directory based protocol have both the merits and the demerits. In general, with the switch type SMP, a hardware scale becomes larger, and a scalability in the case of an increased number of processors is inferior, but a higher performance can be achieved. Accordingly, a system in which the number of PCs, server machines, etc. is not very large (up to about 30) should more advisably be realized by using the switch type SMP.

Another problem involved in constructing a shared memory multiprocessor is the problem of reliability. Each of the shared memory multiprocessors in the prior art has a single OS (Operating System) as the whole system. This method can manage all the processors in the system with the single OS, and therefore has the advantage that a flexible system operation (such as load balancing) can be achieved. In the case of connecting a large number of processors by the shared-memory multiprocessor architecture, however, this method has the disadvantage that the reliability of the system degrades.

In a server of cluster system wherein a plurality of processors are connected by a network or in MPPs (Massively Parallel Processors), individual nodes have different OSs, so that even when a system crash occurs on one node because of, for example, OS bug, the system is down only at the corresponding node. In contrast, in the case of controlling the whole shared-memory multiprocessor system by the single OS, when system crash occurs on a certain processor because of a system bug or the like, the OS itself goes down, and hence, all the other processors are affected.

A method wherein a plurality of OSs are run in the shared-memory multiprocessor for the purpose of avoiding the above problem, is disclosed in "Hive: Fault Containment for Shared-Memory Multiprocessors" (15th ACM Symposium on Operating Systems Principles, Dec. 3–6, 1995, Copper Mountain Resort, Colo., pp. 12–25).

With this method, the shared memory multiprocessor conforming to the directory based protocol is endowed with the following two facilities:

(1) The whole system is divided into a plurality of cells (partitions), and independent OSs are run in the respective partitions. The system has a single address space, and the respective OSs take charge of different address ranges.

(2) A bitmap which expresses write accessible processors is provided every page of the main memory, and write access is allowed only for the processors each having a value of "1" in the bitmap.

More specifically, in a case where data is to be written into the main memory of each processor (in a case where the data is to be cached in compliance with a "Fetch & Invalidate" request, or in a case where a "Write Back" request has arrived), the contents of the bitmap are checked, and only the access from the processor having the value of "1" in the bitmap is allowed.

Owing to the above facility (1), even when the OS of any partition has crashed, it is possible to avoid the other partitions going down. Further, owing to the provision of the facility (2), the processor of the partition having crashed due to a bug can be prevented from destroying data which the other partitions use.

As thus far explained, the reliability of the system can be sharply enhanced by dividing the interior of the shared memory multiprocessor into the plurality of partitions.

SUMMARY OF THE INVENTION

In the case of constructing a switch type SMP and further dividing the interior of the SMP into partitions, as stated in the Prior Art, there are three problems to be mentioned below.

(A) Slow Access to Local Main Memory

In a case where the processor accesses the main memory included in the same board, ideally it ought to be accessible at high speed without passing through the crossbar switch.

In actuality, however, the transaction for maintaining the cache coherency must be submitted to the other processors so as to check the caches of the other processors (hereinbelow, this processing shall be called the "CCC: Cache Coherent Check"). This is because there is a possibility that the copy of the accessed data has been buffered in the cache of another processor.

In the case where the data has been actually buffered in the cache of any other processor, the CCC is required. However, in a case where the accessed data is local data having never been accessed from any other processor, there is no possibility that the corresponding data has been buffered in the cache of any other processor, CCC could be omitted.

Therefore, the wasteful CCC incurs, not only the drawback that the access latency is prolonged, but also the drawback that the traffic in the switch is enlarged.

In the directory based protocol, on the other hand, the wasteful CCC does not occur because directory makes it possible to tell which processors have a copy of data line in the cache. As stated before, however, the directory based protocol has, not only the drawback that the amount of hardware for the directory is large, but also the drawback that overhead for managing the directory is very large.

By way of example, the directory of a system with 16 processors, "4 GB" main memory and "64 B"/line requires a main memory capacity which is as large as:

4 GB/64 B×16 bits=128 MB

Accordingly, a sharp reduction in the amount of hardware is necessitated.

(B) Addresses of Partition not Beginning at Address "0"

With the partition management mechanism in the prior art, the whole system forms the unitary address space. Accordingly, addresses space of each partition do not begin at address "0".

Assuming by way of example that the number of the partitions is 2 and that the main memory capacity of each partition is 1 MB, the partition "0" has an address space of the address "0" to address "1 M−1", whereas the partition "1" must have an address space of the address "1 M" to address "2 M−1".

The existing OSs are premised on the fact that the main memory is installed with its addresses beginning at the address "0", so the above limitation is a serious obstacle in the case of using the OSs in the prior art.

(C) Large Amount of Hardware for Partition Management

In the case of employing the partition management mechanism of the prior art example, bitmap indicating whether the individual processors are allowed to access the corresponding page or not is stored for every 4 KB page. Accordingly, there is the problem that the hardware amount of the corresponding bitmap is very large.

Assuming by way of example that the number of the processors is 16 and that the main memory capacity of the system is 4 GB, a memory whose capacity is as large as:

4 GB/4 KB×16=16 MB is required for the partition management, and an increase in cost is incurred.

Accordingly, the first object of the present invention is to realize with a small hardware overhead, a shared memory multiprocessor in which local data never accessed from any other processor can be accessed rapidly without executing the CCCs to other nodes.

Another object of the present invention is to construct a shared memory multiprocessor which, when divided into partitions, permits the local main memory of each partition to have an independent address space, thereby to begin the addresses of the local main memory at address "0", and also permits the necessary areas of a main memory to be shared.

A further object of the present invention is to realize the above partition management with a small amount of hardware.

In order to accomplish the objects, the present invention consists in a shared memory multiprocessor having a plurality of nodes and a network for connecting the nodes, each of the nodes including at least one CPU and cache and a main memory, a cache coherent control being performed among the nodes by the use of the network; wherein each of said nodes comprises a table in which, in correspondence with each page of the main memory of a particular node, a first bit is stored for indicating if the corresponding page has been accessed from any other node, and in which the first bit is reset at initialization of the system of the multiprocessor and is set by hardware when the corresponding page of the main memory has been accessed from other nodes; and means operating when the CPU of the particular node accesses the main memory of the same particular node, for checking the first bit of the table as corresponds to the page to be accessed, so as to perform the cache coherent control for the other nodes in a case where the first bit is set and to inhibit the cache coherent control for the other nodes in a case where the first bit is not set.

Further, when system software allocates a page of the main memory, the bit of the table corresponding to the page to be allocated is reset by the system software.

In addition, one bit is allocated to the table as a second bit that is stored in correspondence with each page of the main memory to indicate that the cache coherent control for the corresponding page is unnecessary; and when the CPU of the particular node accesses the main memory of that particular node, the means checks the second bit so as to judge the necessity for the cache coherent control for the other nodes in accordance with a value of the first bit in a case where the second bit is not set, and to inhibit the cache coherent control for the other nodes in a case where the second bit is set.

In a shared memory multiprocessor having a plurality of nodes and a network for connecting the nodes, each of the nodes including at least one CPU and cache and a main memory, a cache coherent control being performed among the nodes by the use of the network, the nodes to share the main memory being permitted to be divided into a plurality of partitions each including at least one node; wherein the main memory of each of the nodes is divided into a shared area which is accessible from all of the nodes, and a local area which is accessible only from within the corresponding partition, and wherein separate start addresses are designated for the respective areas.

Further, each of the nodes comprises means for deciding whether an accessed address is of the local area or of the shared area, and means for deciding which of the nodes are included in the partitions; and when a command for the cache coherent control is to be issued to the other nodes, the command is broadcast to all of the nodes within a system of the multiprocessor as to the access command to the shared area and is multicast only to the nodes within the corresponding partition as to the access command toward the local area. In addition, addresses of the local areas of each of the partitions begin at address "0".

Further, there are comprised means for deciding whether the access address is of the local area or of the shared area when a cache coherent command has arrived from any other node; and means for deciding whether the node of an access source lies inside the corresponding partition or outside the corresponding partition; whereby, in case of the decision that the command has arrived at the local area from the node lying outside the corresponding partition, the access is inhibited, and an error is reported.

Also, each of the nodes comprises a register for storing configuration information of the shared area, which contains a start address of the shared area, and the size of the shared area which each of the processors takes over. Additionally, each node has the configuration information of local area of each node in the partition which contains a set consisting of a start address and an end address of the local area.

Further, each of the nodes comprises means for storing distribution of the nodes within the corresponding partition in terms of a bitmap, as means for storing configuration information of the corresponding partition.

DETAILED DESCRIPTION OF THE PREFERRED EMBODIMENTS

Figure 1A:
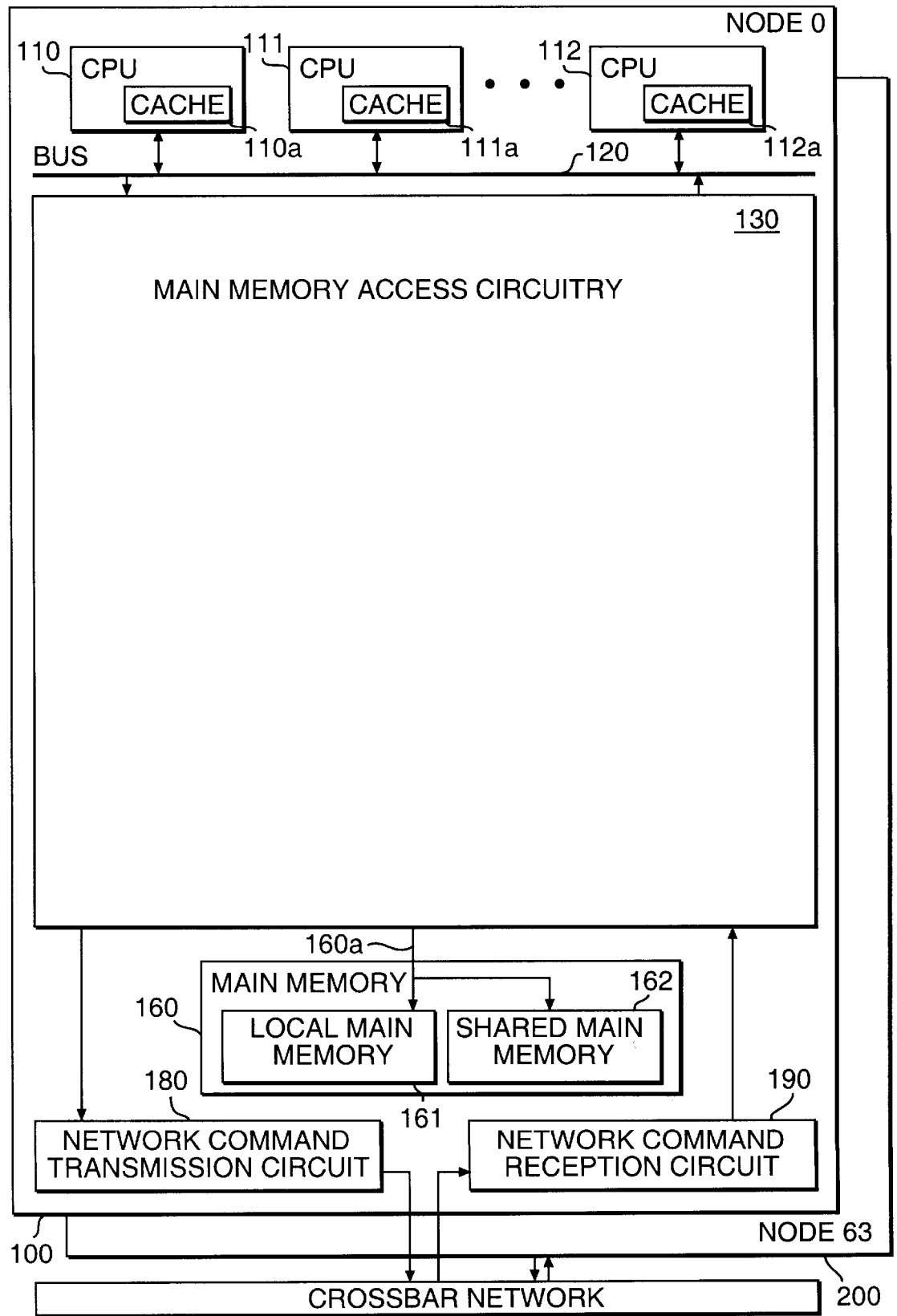
FIG. 1A illustrates a shared memory multiprocessor of the present invention.

Now, a shared memory multiprocessor according to the present invention will be described in more detail with reference to the aspects of performance illustrated in the drawings.

(1) Outline of the Apparatus

Figure 1B:
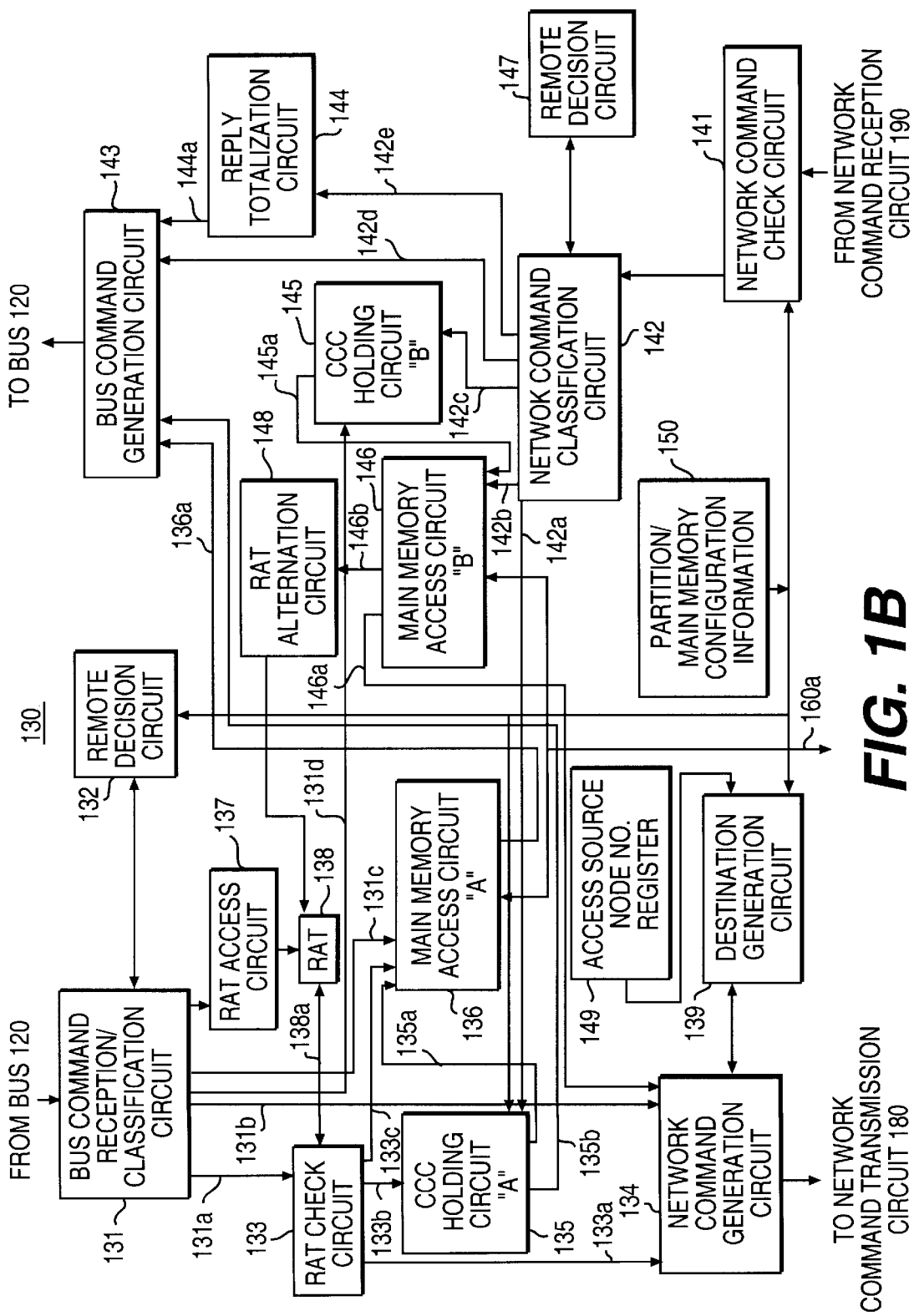
FIG. 1B illustrates a main memory access circuit in FIG. 1A.
Figure 2:
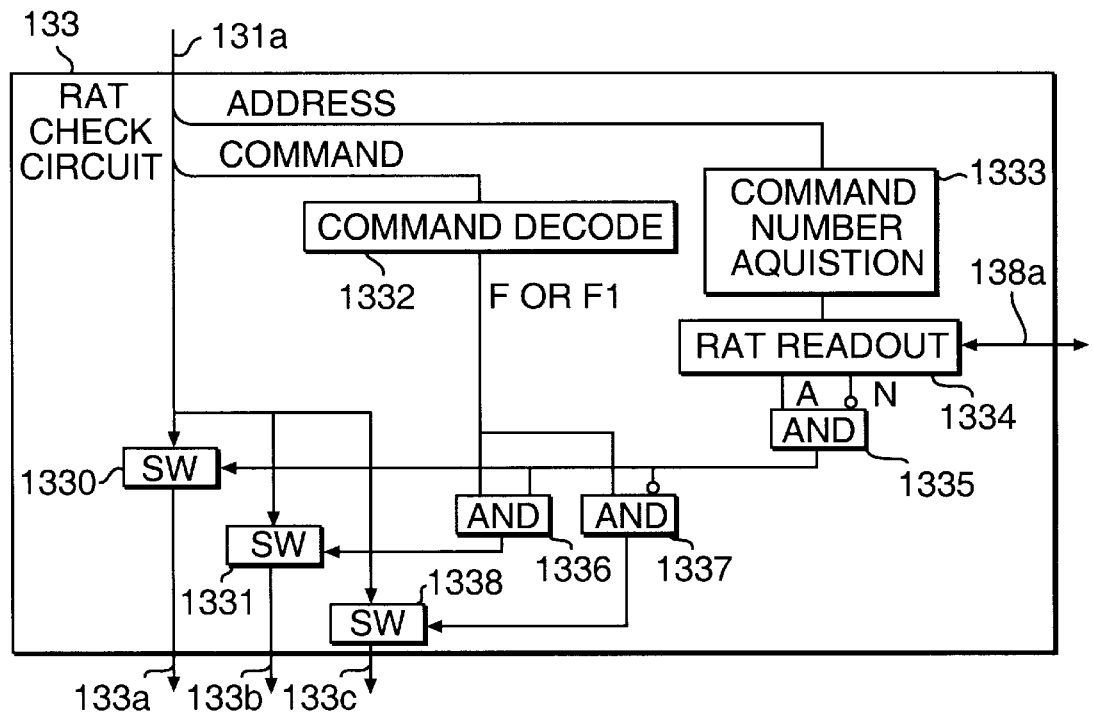
FIG. 2 is a block diagram of a RAT check circuit in each node.

FIG. 1A and FIG. 1B are block diagrams of a shared memory multiprocessor which include a cache coherency holding mechanism according to the present invention.

This system is a system of 64 nodes, in which a plurality of nodes, for example, 100 and 200 (which shall be sometimes called the "node 0" and "node 63", respectively) are interconnected by a crossbar network 900. The nodes have the same structure.

More specifically, each of the nodes includes CPUs 110~112 including caches 110a~112a, a (partial) main memory 160, a main memory access circuitry 130, a network command transmission circuit 180, and a network command reception circuits 190. Since the circuits 180, 190 and the network 900 are known techniques, the interiors thereof shall be omitted from description.

The main memory 160 forms part of a main memory which is common to this system. The main memory 160 holds parts or some of programs and data to be used in the nodes. Accordingly, this system is a parallel computer system of so-called "distributed shared memory".

Figure 8:
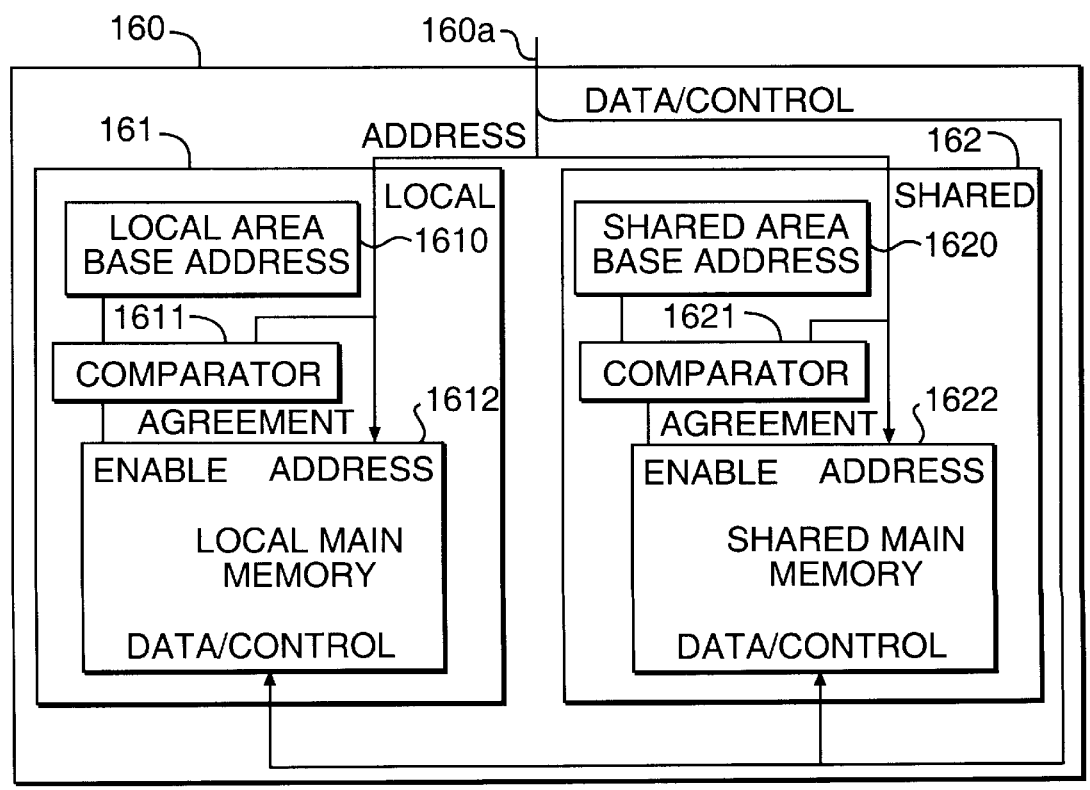
FIG. 8 is a block diagram of a main memory in each node.

The main memory 160 is divided into a local main memory 161 and a shared main memory 162, for which separate addresses can be respectively designated by base address registers 1610 and 1620 (FIG. 8).

At the start up of the system, the base address registers 1610 and 1620 are set in accordance with the address map of the system, together with partition/main memory configuration information register 150 to be explained later.

Although the CPUs within the node are interconnected by a bus 120 in the illustration, they may well be done by a coupling scheme other than the bus, for example, the direct connection of CPUs or the connections of the CPUs through switches.

Since such connecting methods within the node are known techniques, the corresponding internal structures shall not be described in detail.

The main memory access circuitry 130 in FIG. 1B is a circuit arrangement which serves, when a main memory access instruction has been issued by the CPU, to issue a network command for a CCC to each of the other nodes, to issue a main memory access command to each of the other nodes, to access the main memory included in the particular node of its own, and to execute a CCC command and a main memory access command sent from any other node.

First, circuits on a transmission side will be explained. A bus command reception/bus command classification circuit 131 is a circuit for receiving a bus command sent from the CPU and for classifying the bus command.

A remote decision circuit 132 is a circuit for judging whether an address accessed from the CPU is internal (an address of the main memory included in the particular node) or remote (an address of the main memory possessed by any other node). The circuit 132 judges the "internal" or "remote" by the use of the contents of the partition/main memory configuration information 150. The circuits 132 and 150 are peculiar to this aspect of performance.

A RAT (Remote Access Table) 138 is a circuit for storing therein the attributes (whether or not a page has been accessed from any other node, and if the CCC to any other node is necessary or not) of each of the pages of the main memory included in the particular node. A RAT check circuit 133 is a circuit for checking the RAT value of the address accessed from the CPU and for starting a necessary operation. A RAT alternation circuit 148 is a circuit for altering the RAT value of the page accessed from any other node. These circuits 138, 133 and 148 are peculiar to this aspect of performance.

A RAT access circuit 137 is a circuit for accessing the RAT from the CPU for the purposes of initialization etc.

A network command generation circuit 134 is a circuit for generating such network commands as a CCC command, an other-node main memory access command, and a reply command to any other node.

A destination generation circuit 139 is a circuit for judging and deciding the destination node of the network command from the access address and the access command. The destination generation circuit 139 executes an operation peculiar to this aspect of performance.

A CCC holding circuit "A" 135, when the CPU accesses data in the main memory of the same node, serves to remember the occurrence of the CCC issued to the other nodes and totalize the reply commands to the CCCs as returned from the other nodes. A main memory access circuit "A" 136 serves to access the contents of the main memory 160 of the particular node as accessed by the CPU.

Next, circuits on a reception side will be explained. A network command check circuit 141 is a circuit which serves to check the consistency of the address and source node number of the network command with the contents of the partition configuration information 150, and which is peculiar to this aspect of performance.

A network command classification circuit 142 is a circuit for classifying the network command sent from any other node.

A remote decision circuit 147 is a circuit for judging whether the access address of the command sent from any other node is internal or remote. The remote decision circuit 147 is peculiar to this aspect of performance. A bus command generation circuit 143 is a circuit for delivering the CCC command etc. sent from any other node, to the bus included in the particular node.

A reply totalization circuit 144 is a circuit for totalizing replies to data fetch requests sent to the other nodes and for selecting data to be sent back to the CPU.

A CCC holding circuit "B" 145 serves, when any other node has accessed the main memory of the particular node, to store therein the contents of the CCC command issued to the bus of the particular node and to hold a reply from the bus of the particular node. A main memory access circuit "B" 146 accesses the main memory 160 within the particular node in compliance with a request made by any other node.

An access source node number register 149 is a latch circuit which serves to temporarily store the node number of an access source therein when the access command from any other node has arrived. It is used for finding the node number of the reply destination. ps (2) Explanation of Bus and Network Commands (2-1) Bus Commands Six commands to be stated below are used on the bus 120 within the node. Letters enclosed in parentheses are abbreviations which are used in this embodiment.
Fetch (F)

This command makes a request for the line transfer of data. It is issued in a case where the load command of the CPU has missed. It is one of CCC commands.

Fetch & Invalidate (FI)

This command makes a request for the line transfer of data, and simultaneously a request for the invalidation of the data retained in any other cache. It is issued in a case where the store command of the CPU has missed. It is one of the CCC commands.
Invalidate (I)

This command makes a request to invalidate data retained in any other cache. It is issued in a case where the CPU has presented a write request to a cache line which is shared with any other cache. It is one of the CCC commands. Write Back (WB)

This command makes a request for the write back of a cache line. It arises when data in cache has been replaced.
Data (D)

This command makes a request for data transfer. It is a reply to the F or FI command.
No Data (ND)

This indicates the state in which any of the CPUs does not issue the D command in reply to the F or FI command. Although it does not exist as an explicit command on the bus, it shall be handled as a command for the sake of convenience.

On the bus 120, an address is transferred in attendance on each of the commands, and the data (cache line) is further transferred in the WB or D command.

(2-2) Network Commands

Seven sorts to be stated below are existent as network commands. Regarding the same commands as the bus commands, significances shall not be explained.
Fetch (F)
Fetch & Invalidate (FI)
Invalidate (I)
Write Back (WB)
Data (D)

This is a command for sending the data retained in the cache, in reply to the F or FI command.
Data Mem (DM)

This is a command for sending the data stored in the main memory, in reply to the F or FI command. Here, in a case where the D command has come from the cache of any other node, the data sent in reply to the DM command must be neglected.
No Data (ND)

This is a reply for indicating to the F or FI command the fact that any of the CPUs does not issue the D command in the particular node.

(2-3) Command formats

Figure 6:
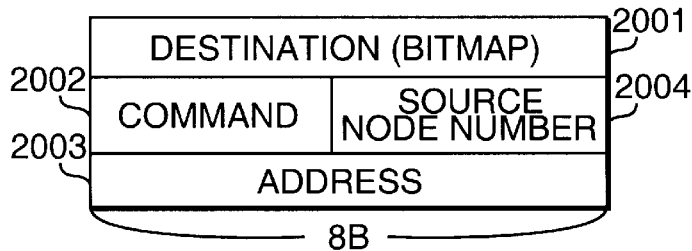
FIG. 6 illustrates the packet format of each of F, FI, I and ND commands on a network.
Figure 7:
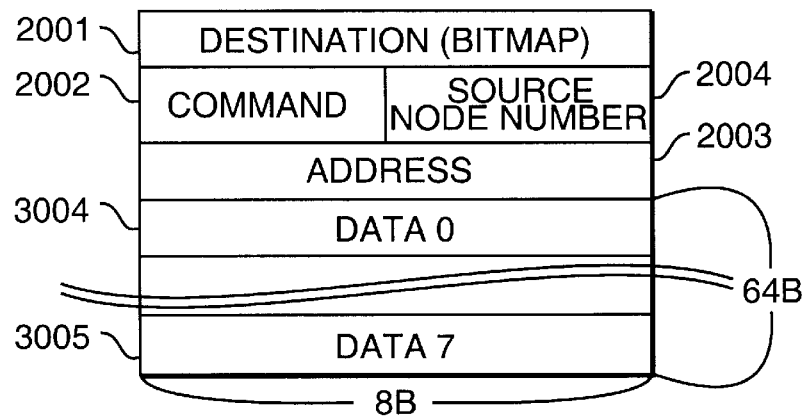
FIG. 7 illustrates the packet format of each of WB, D and DM commands on the network.

FIGS. 6 and 7 illustrate formats for the bus commands.

FIG. 6 shows a format for each of the F, FI, I and ND commands. This format contains a bitmap expressive of a number of a destination node 2001, a number of an access source node 2004 and an access address 2003 in addition to the command itself 2002.

Here, since the destination node number is expressed by the bitmap 2001, multicast toward a plurality of specified nodes (for example, nodes within the partition) can be readily incarnated by setting a plurality of bits. Broadcast toward all the processors of the system can also be incarnated by setting all bits.

FIG. 7 shows a format for each of the WB, D and DM commands. This format contains the data 0~data 7 of the cache line 3004, 3005 in addition to the aforementioned information items.

(3) Operations for Access from CPU

Hereunder, in case of access from CPU, the operations of the main memory access circuitry 130 will be explained successively as to separate cases.

When a command has been delivered onto the shared bus, the bus command reception/bus command classification circuit 131 sends an accessed address to the "remote" decision circuit 132. The "Remote" decision circuit 132 judges whether the delivered command is accessing the address of the main memory of the particular node of its own ("internal") or the address of the main memory of any other node ("remote"). Wherein the "remote" decision circuit 132 makes a decision of "internal"/"remote" by using the contents of the partition/main memory configuration information 150.

FIG. 5A to FIG. 5E illustrate the contents of the partition/main-memory configuration information 150. The information is stored in registers.

The partition/main-memory configuration information 150 has a bitmap (partition register)1500 which indicates the nodes belonging to the partition and a register 1506 which expresses the number of the nodes included in the partition.

Further, regarding the shared areas, the partition/main-memory configuration information 150 has therein the head address (base address) of the shared areas 1501 and the size of the shared areas per node 1502. Here, all the shared areas of the respective nodes have the same size.

Further, regarding the local areas, the partition/main-memory configuration information 150 has therein the start address 1503 and end address 1504 of the local area as to each of the nodes included in the partition. This information is valid only for the nodes whose corresponding bits in the partition register 1500 are "1"s. Since the respective nodes have the separate registers, the main memory capacities of the individual nodes may well differ as to the local areas.

The "remote" decision circuit 132 in FIG. 1B checks if the access address denoted by A lies between the start address 1503 and end address 1504 of the local area of the particular node (Relation 1). Further, letting N denote the number of the particular node, B denote the contents of the shared area base address register 1501, and S denote the contents of the shared area size/node register 1502, the "remote" decision circuit 132 checks if the following inequalities hold:

$$B+S\times N<A<B+S\times(N+1) \quad \text{(Relation 2)}.$$

When either of the above relations holds, the "remote" decision circuit 132 notifies the bus command reception/bus command classification circuit 131 of the fact that the accessed address is internal. And when not, it notifies the circuit 131 of the fact that the accessed address is of the remote main memory.

Thereafter, the bus command reception/bus command classification circuit 131 performs different operations, depending upon the sort of the access command and upon whether the access address is internal or remote.

(A) Case of F or FI Command to Internal Address

First, the access address and command are sent to the RAT check circuit 133 from the bus command reception/bus command classification circuit 131 through a line 131a.

The RAT check circuit 133 checks the content of the RAT 138 corresponding to the accessed page, and judges if the CCC to any other node is required.

Figure 3:
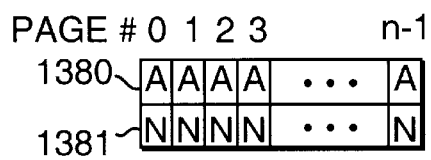
FIG. 3 is a block diagram of a RAT in each node.

FIG. 3 illustrates the details of the RAT (Remote Access Table) 138 in each node. The RAT is a memory in which two bits A (1380) and N (1381) are stored every page.

Figure 9:
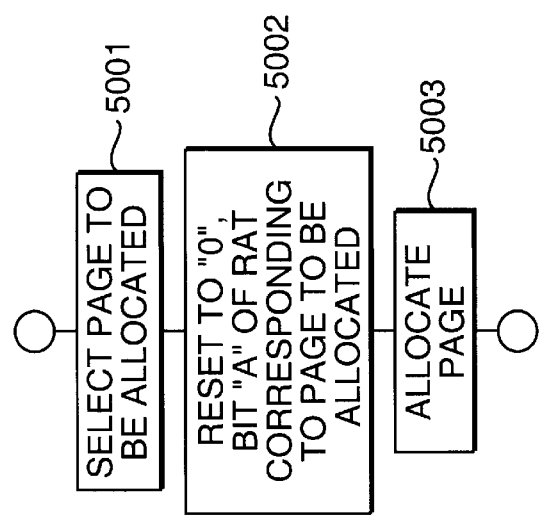
FIG. 9 is a flow chart in the case of allocating the page of the main memory in the multiprocessor system of the present invention.

The bit A indicates if the CCC to the other node is necessary. The bit A being "0" indicates that the corresponding page has never been accessed from any other node (accordingly, that the CCC to the other node is unnecessary). On the other hand, the bit A being "1" indicates that the corresponding page has ever been accessed from any other node (accordingly, that the CCC to other nodes is necessary). The bit A is cleared to "0" when the system is started up, and it is also reset to "0" by software when the software allocates a certain page. FIG. 9 illustrates the algorithm of the page allocation in this embodiment. First, a page to be allocated is selected (step 5001). Next, bit "A" of RAT corresponding to the page to be allocated is reset to "0" (step 5002). Last, the page is allocated (step 5003). Thus, even in a case where the page has been re-allocated by the system software or middle-ware so as to be re-used again, the proper operation of the RAT can be guaranteed. The bit A is set to "1" by hardware (the RAT alteration circuit 148). This will be stated later.

The bit N is used in order to indicate the page for which an ordinary cache coherent management is unnecessary. The bit N being "0" indicates that the corresponding page is a subject for the ordinary cache coherent management. On the other hand, the bit N being "1" indicates that the corresponding page is subjected to a coherent management by software (using instructions such as purge and flash), so the ordinary cache coherent management is unnecessary therefor. The command for the CCC to other nodes is not issued as to the page whose bit circuit 1333 gets a page number from an address. Then, a RAT readout circuit 1334 reads out through a signal line 138a the values of the RAT 138 corresponding to the accessed page by using the page number. Thereafter, if A=1 and N=0 hold (that is, if the CCC to any other node is necessary) is judged by an AND gate 1335.

In the case where the CCC to the other node is necessary (the case where A=1 and N=0), the RAT check circuit 133 requests the network command generation circuit 134 to issue the command to the other node, through a switch 1330 as well as a signal line 133a. And in a case where the CCC to the other node is necessary and where the command is the F or FI (as judged by a command decode circuit 1332 and an AND gate 1336), the RAT check circuit 133 requests the CCC holding circuit "A" 135 to hold the result of the CCC, through a switch 1331 as well as a signal line 133b.

In contrast, in the case where the CCC to the other node is unnecessary (the case where A=0 or N=1 holds), the RAT check circuit 133 judges if the command is the F or FI, by means of an AND gate 1337. And in a case where the command is the F or FI and where the outward CCC is unnecessary, the RAT check circuit 133 requests the main memory access circuit "A" 136 to read out the contents of the main memory, through a switch 1338 as well as a signal line 133c. That is, the main memory can be immediately accessed by omitting the outward CCC.

(A1) Case where CCC to Other node is Unnecessary

In this case, the access address is communicated to the main memory access circuit "A" 136 through the signal line 133c. The main memory access circuit "A" 136 reads out the data of the accessed data line from the main memory 160 included in the particular node (in the same way for both the local area 161 and the shared area 162). Then the main memory access circuit "A" 136 brings the read out data back to the CPU within the particular node through a line 136a as well as the bus command generation circuit 143.

(A2) Case where CCC to Other node is Necessary

First, the RAT check circuit 133 requests the network command generation circuit 134 to send the F or FI command to the other node, through the signal line 133a. Simultaneously therewith, the RAT check circuit requests the CCC holding circuit "A" 135 to hold the reply from the other node, through the signal line 133b.

The network command generation circuit 134 forwards the command to the node judged by the destination generation circuit 139. To be noted here is that, since the destination node is expressed by the bitmap corresponding to all the 64 nodes as indicated in FIGS. 6 and 7, the broadcast or the multicast can be designated by setting a plurality of nodes in the bitmap.

Figures 11, 12:
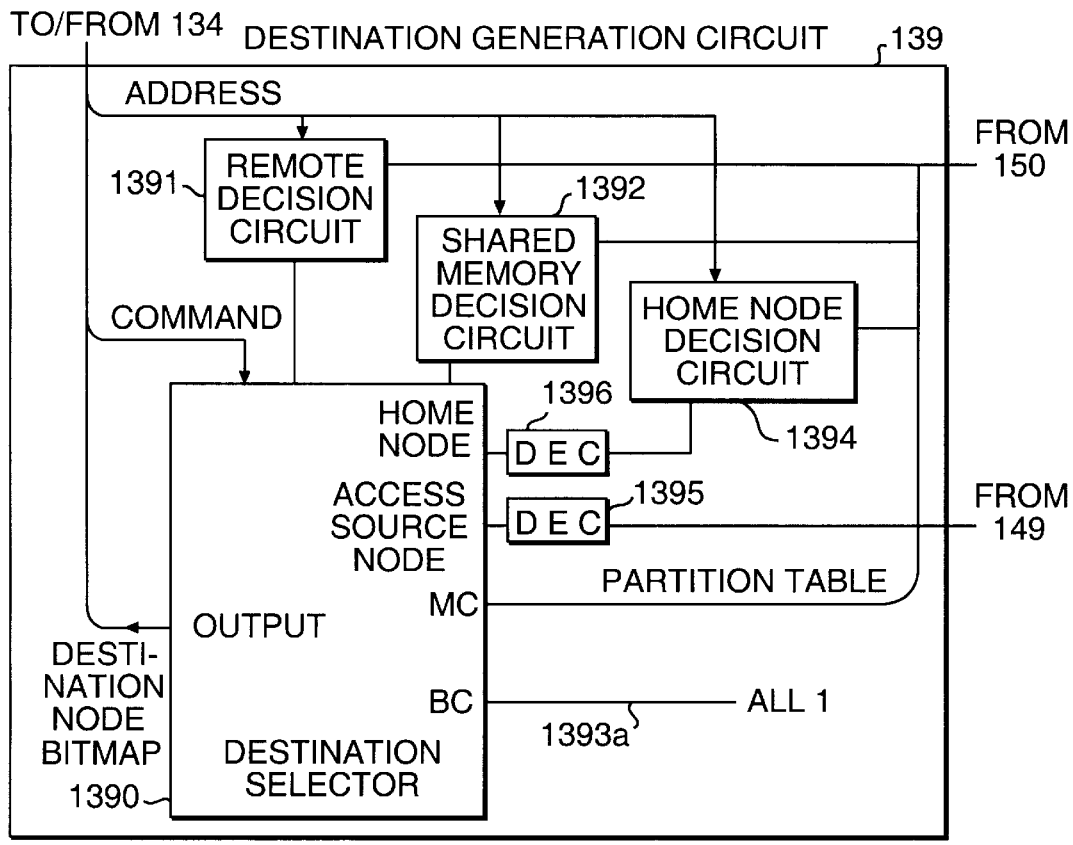
FIG. 11 is a block diagram of a destination generation circuit in each node.
FIG. 12 is a diagram showing the table of the relations between the inputs and outputs of a destination selector which is included in the destination generation circuit of each node.

The destination generation circuit 139 is explained hereinafter. FIG. 11 illustrates the arrangement of the destination generation circuit 139. In the destination generation circuit 139, a "remote" decision circuit 1391 first judges whether the access address is internal or remote, and a shared memory decision circuit 1392 also judges if the access address is within the shared memory.

The operation of the "remote" decision circuit 1391 is the same as that of the "remote" decision circuit 132.

In shared memory decision circuit 1392, letting A denote the access address, B denote the content of the shared area base address register 1501, and S denote the content of the shared area size/node register 1502, the shared memory decision circuit 1392 checks if the following inequalities hold:

$$B<A<B+S\times 64.$$

If the access address lies within the above range, it is the address of the shared memory.

Further, the home node of the access address is found by a home node decision circuit 1394. Wherein the "home node" signifies the node which has the access address in its main memory. The home node number is decoded by decoder 1396 then is input to a destination selector 1390.

Concretely, the home node is found by the steps of procedure as stated below (hereinbelow, the access address shall be denoted by A) by using the partition/main memory configuration information 150.

The access address A is compared with the start address 1503 and end address 1504 of the local area register corresponding to all the nodes. In a case where the address A lies between the start address and end address of any node HL, this node HL is the home node (the address A corresponds to the local area thereof).

Further, letting B denote the content of the shared area base address register 1501, and S denote the content of the shared area size/node register 1502, the following computation is executed:

$$HS=(A-B)/S \text{ (Decimal places are truncated).}$$

In a case where the value HS is equal to or greater than 0 and is less than 64, it indicates the number of the home node (the address A corresponds to the shared area thereof).

A destination selector 1390 performs any of operations indicated in FIG. 12, in accordance with the above judged result, the access command, and the access source node number 149 input through decoder 1395. In case of the command F, FI or I, for the access address in the shared area, a bitmap 1393a of all "1"s is selected in order to broadcast the command to all the nodes (here, it is assumed for the brevity of explanation that all the 64 nodes are installed, but a system in which the number of installed nodes is smaller than 64 can also be coped with by changing the bitmap), and for the access address in the local area, the contents of the partition register 1500 are selected in order to multicast the command only to the nodes within the partition. In case of the D or DM command, or in case of the ND command which has remote main memory address, a result obtained by decoding (turning into a bitmap) the value of the access source node number register 149 is selected, and it is sent to the node of the access source in reply. In case of the WB command directed toward any remote main memory, the decoded result of the home node number found by the circuit 1394 is selected, and the corresponding data is written back into the home node. The WB or ND command directed toward any internal address is an error (because such cases don't occur).

The destination generation circuit 139 is hereinbefore explained, with reference to FIG. 11 and FIG. 12.

Herein, the command is the F or FI, so that the command is multicast to all the nodes within the partition on the occasion of the access address included in the local area, while it is broadcast to all the nodes within the system on the occasion of the access address included in the shared area. The result of the F or FI command issued to the other node is sent in reply by the D or ND command. The reply command sent from the other node has its consistency with the partition/main memory configuration information 150 checked by the network command check circuit 141, and it is thereafter delivered to the network command classification circuit 142.

The network command classification circuit 142 issues the command at a corresponding one of its outputs in accordance with the sort of the command and with whether the accessed address is internal (in the main memory of the particular node) or remote (in the main memory of any other node) (as judged using the "remote" decision circuit 147 the operation of which is quite the same as that of the circuit 132). In case of the N or ND command directed toward the internal address, this command is sent to the CCC holding circuit "A" (135) through a signal line 142a.

Figure 14:
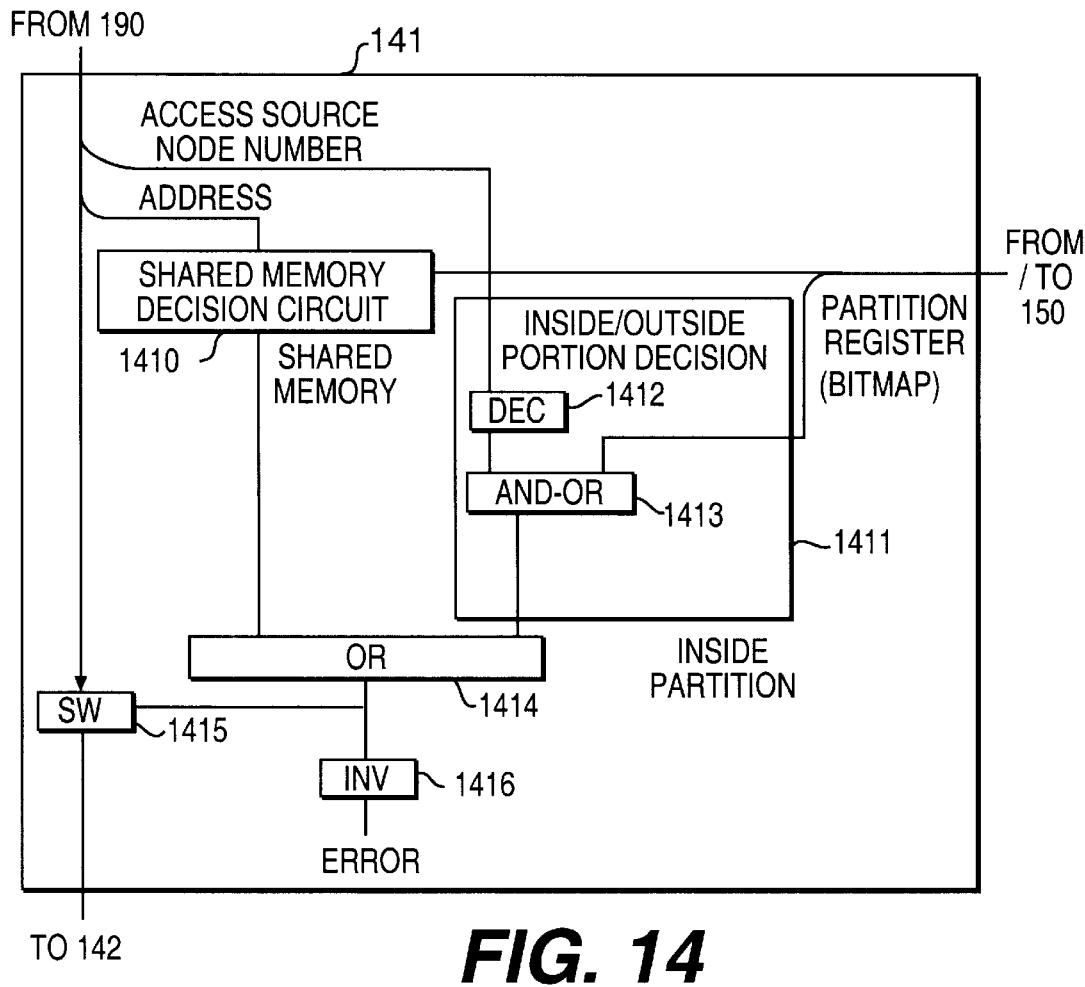
FIG. 14 is a block diagram of a network command check circuit in each node.

FIG. 14 illustrates the details of the network command check circuit 141. The network command check circuit 141 is a circuit by which access to the local area from any node located outside the pertinent partition is detected as an error. In order to protect the local area against the improper access from any other partition, only the nodes located inside the pertinent partition are allowed to access the local area.

First, whether or not the access address is the address of the shared memory is judged by a shared memory decision circuit 1410 (the operation of which is the same as that of the circuit 1392).

Further, if the node of the access source lies inside the pertinent partition is judged by an "inside/outside partition" decision circuit 1411. Concretely, the decision circuit 1411 checks if the bit corresponding to the node number of the access source is set in the partition register 1500, by using a result obtained in such a way that the decoded result of the access source node number of the network command as produced by a decoder 1412, and the bit value of the partition register 1500 (the bitmap which expresses the nodes included in the pertinent partition) are passed through an AND-OR gate 1413.

In a case where the access is proper as the result, that is, in a case where the access address is of the shared memory or where the node of the access source lies inside the pertinent partition, the access command is sent to the network command classification circuit 142 through a switch 1415 in response to a signal from a OR gate 1414.

In the case of the improper access, the error is reported by an INV gate 1416 (the access is inhibited by the switch 1415) in response to a signal from a OR gate 1414.

Thus, the improper access from any other partition to the local area can be prevented.

The result of the issue of the F or FI command designated to the internal address to other nodes is divided into a case where the commands ND return from all the nodes, and a case where the command D returns from at least one node (the commands ND return from all other nodes except the at least one node).

The replies from other nodes are totalized by the CCC holding circuit "A" (135), and the system performs a corresponding operation.

Figure 10:
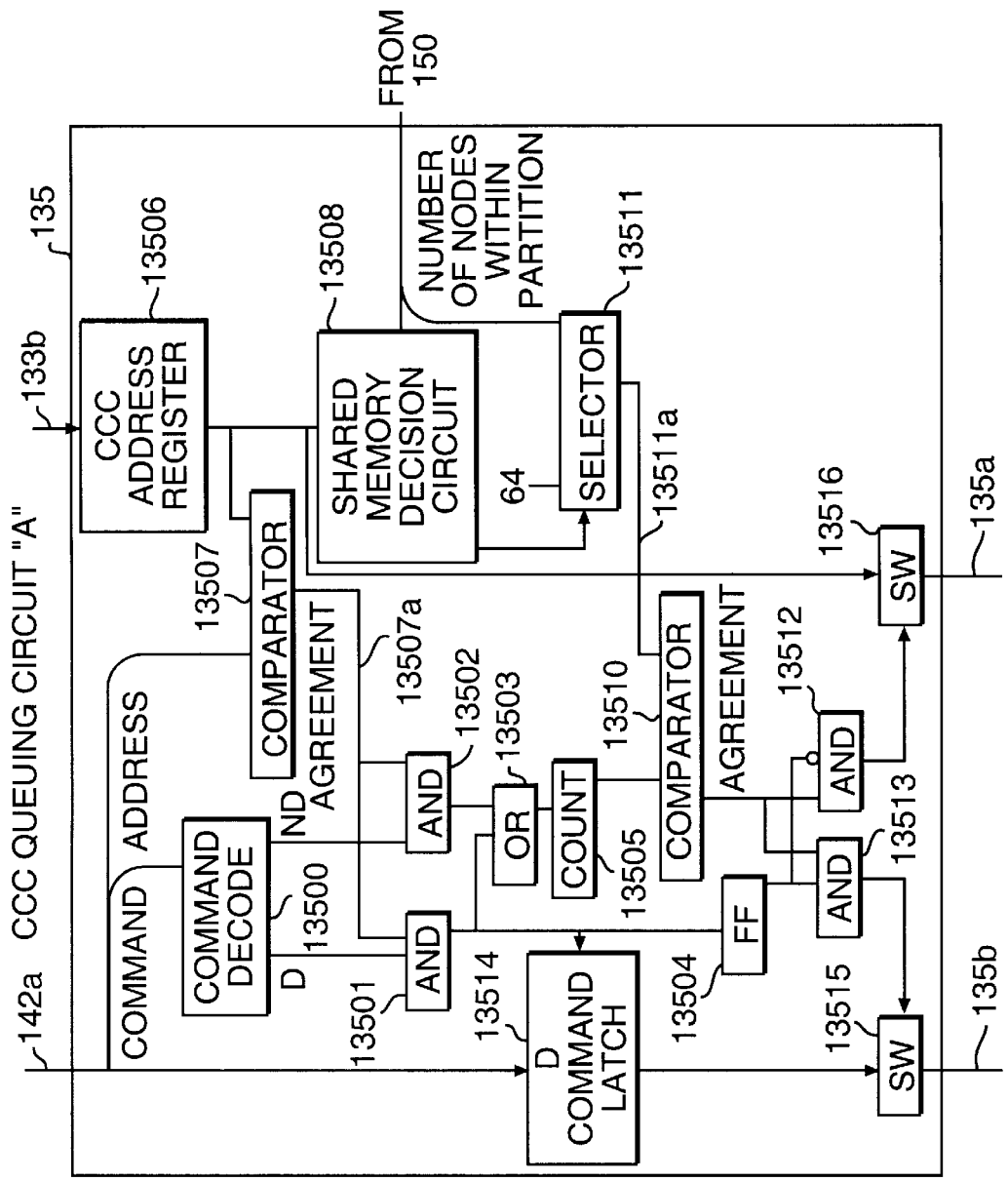
FIG. 10 is a block diagram of a CCC holding circuit "A" in each node.

FIG. 10 illustrates the details of the CCC holding circuit "A" (135).

A CCC address afforded through the signal line 133b is stored in a register 13506. Later, when the reply (D or ND command) to the CCC has come from any other node, it is first compared with the CCC address 13506 by a comparator 13507. On condition that the result of the comparison is agreement, whether the command is the D or the ND is judged by a command decoder 13500 and AND gates 13501 and 13502.

In a case where the D command has arrived (if any) (that is, in a case where the latest data has been sent from other cache), a flip-flop (FF) 13504 is set to remember the arrival of the D command therein, while at the same time, the content of the D command is stored in a latch 13514 (the value sent by the D command is brought back to the CPU later).

Apart from the above operations, each time D or ND command arrives, a counter 13505 is caused to count up through a gate 13503, thereby to reckon how many replies have hitherto come. When the value of the counter has agreed with the expected number of replies as indicated by a signal 13511a, it is decided that all the replies have come, and the holding of the CCCs is ended.

In a case where the content of the flip-flop 13504 is "1" at that time, a switch 13515 is turned ON in response to a signal from an AND gate 13513, and the data sent in reply by the D command as stored in the latch 13514 is brought back to the CPU through a signal line 135b as well as the bus command generation circuit 143. In contrast, in a case where the content of the flip-flop 13504 is "0" (that is, on condition that the No Data commands have been sent in reply from all the other nodes), a switch 13516 is turned ON in response to a signal from an AND gate 13512, and the access address stored in the CCC address register 13506 is communicated to the main memory access circuit "A" (136) through a signal line 135a, whereby the circuit "A" (136) is requested to access data stored in the main memory.

The expected number of replies as indicated by the signal 13511a is found by the steps of procedure to be stated below. First, if the access address stored in the CCC address register 13506 is of the shared main memory is judged by a shared memory decision circuit 13508 (the operation of which is the same as that of the circuit 1392), and the result is communicated to a selector 13511. When the access address is of the shared memory, the selector 13511 outputs "64" (the number of all the nodes of the system, but the number of installed nodes is designated in a case where it is smaller than "64"), and when not (the access address is of the local memory), it outputs the value of the register 1506 for the number of nodes within the pertinent partition. Thus, the number of nodes for accessing the corresponding data can be obtained.

(A2a) Case where Replies from Other nodes are All NDs

The main memory access circuit "A" (136) is requested to access the main memory 160 within the particular node, through the signal line 135a by the CCC holding circuit "A" (135), and the accessed data is brought back to the CPU.

(A2b) Case where D command has been sent in Reply from Any node

The latest data sent in reply by the D command is brought back to the CPU through the signal line 135b and the bus command generation circuit 143 by the CCC holding circuit "A" (135).

(B) Case of I Command to Internal Address

In this case, the procedure up to the step at which the necessity for the CCCs directed to the other nodes is checked by the RAT check circuit 135 is the same as in the case (A).

(B1) Case where CCCs toward Other nodes are Necessary

The RAT check circuit 133 requests the network command generation circuit 134 through the signal line 133a to generate the I command toward the other nodes (there is no reply to the I command). The network command generation circuit 134 sends the command to the nodes designated by the destination generation circuit 139. More specifically, the I command toward the local area is multicast to all the nodes within the partition, while the I command toward the shared area is broadcast to all the nodes of the system.

(B2) Case where CCCs toward Other nodes are Unnecessary

In the case of the I command, data access to the main memory is unnecessary, and hence, nothing takes place. More specifically, since the command decode circuit 1332 outputs "0", the output of the gate 1337 is "0", and nothing is output to the signal line 133c.

(C) Case of WB Command toward Internal Address

In this case, the bus command reception/bus command classification circuit 131 requests the main memory access circuit "A" 136 through a signal line 131c to write written back data into the main memory 160.

(D) Case of F or FI Command toward Remote Addresses

In this case, the circuit 131 requests the network command generation circuit through a signal line 131b to generate the F or FI command toward the other nodes.

The network command generation circuit 134 sends the command to the nodes designated by the destination generation circuit 139. More specifically, the F or FI command toward the local area is multicast to all the nodes within the partition, while the F or FI command toward the shared area is broadcast to all the nodes of the system.

The three sorts of commands D, DM and ND can arrive in reply to the F or FI directed to the remote addresses. When the D, DM and ND commands have arrived in reply from the remote addresses, the network command classification circuit 142 delivers them to the reply totalization circuit 144 through a signal line 142e.

Herein, the combinations of the reply commands are divided into:

(i) Case where the DM command returns from the home node, and where the commands ND return from all the other nodes (ii) Case where the DM command returns from the home node, and where the D command returns from at least one of the other nodes (the ND commands return from the remaining nodes)

(iii) Case where the D command returns at least one of the nodes including the home node (the ND commands return from the remaining nodes.)

In the case (i), the value read out of the main memory of the home node and sent by the DM command is used, whereas in the case (ii), data retained in the cache of any other node must be preferred (because the data in the cache might have been altered), so that data sent from the main memory of the home node by the DM command is discarded, and the data sent from the cache by the D command is utilized. In the case (iii), data sent from the cache of any node by the D command is employed.

The replies from the individual nodes are totalized by the reply totalization circuit 144, any of the cases (i), (ii) and (iii) is judged, and the result of the access (data line) is brought back to the CPU of the access source.

Figure 13:
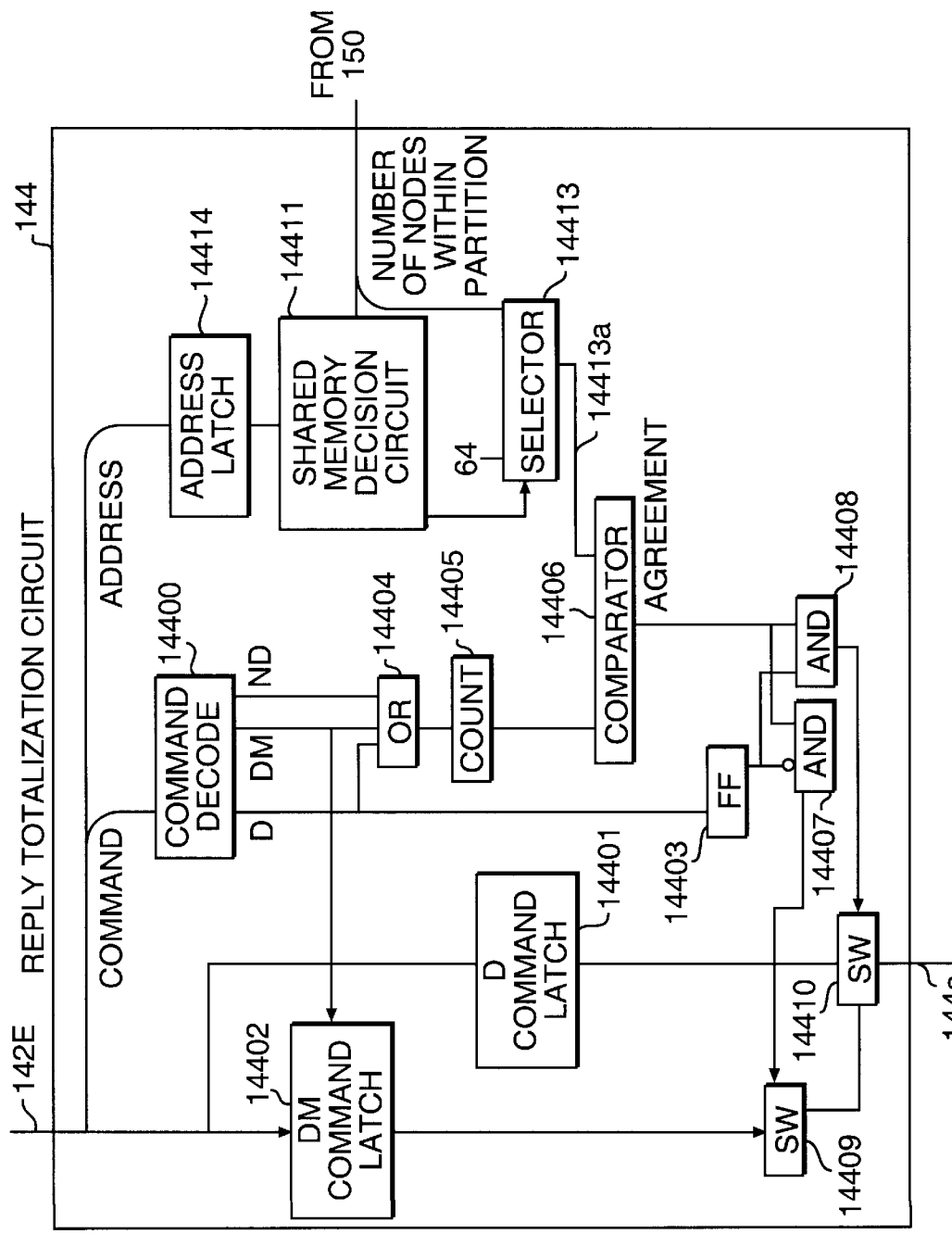
FIG. 13 is a block diagram of a reply totalization circuit in each node.

FIG. 13 illustrates the details of the reply totalization circuit 144.

First, the command sent from any other node is decoded by a command decode circuit 14400.

In the case of the D command, the contents (address, data) of this D command are stored by a latch 14401, and it is remembered by a flip-flop 14403 that at least one D command has arrived. In the case of the DM command, the contents of this DM command are stored by a DM command latch 14402.

Concurrently therewith, each time one D, DM or ND command arrives, a counter 14405 is caused to count up through a OR gate 14404 so as to reckon the number of the replies having arrived. When the value of the counter has agreed with the expected number of replies as indicated by a signal 14413a from a selector 14413 (as judged by a comparator 14406), it is decided that all the replies have arrived. Herein, in a case where the D command has come if any (when the content of the flip-flop 14403 is "1"), and the contents of the D command are supplied to the bus command generation circuit 143 through a signal line 144a by an AND gate 14408 as well as a switch 14410. In contrast, in a case where the D command has not come at all, the contents of the DM command are supplied to the bus command generation circuit by an AND gate 14407 as well as a switch 14409.

Thus, in the case where at least one D command has come, the data in the cache of the other node as sent in reply by the D command is brought back to the accessing CPU, and in the case where quite no D command has come, the value in the main memory of the home node as sent in reply by the DM command is brought back to the accessing CPU.

A shared memory decision circuit 14411, a selector 14413 etc. for obtaining the expected number of replies find the number of the replies of the CCCs with respect to the access addresses held in an address latch 14414. The detailed operations of these circuits are quite identical to those of the circuits (13508, 13511 etc.) of the CCC holding circuit "A" (135).

(E) Case of I Command toward Remote Address

In this case, the RAT is not checked, and the network command generation circuit 134 is directly requested by the signal 131b to send the command toward the corresponding other node. Subsequent operations are similar to those in the case (B1).

(F) Case of WB Command toward Remote Address

In this case, the bus command reception/bus command classification circuit 131 requests the network command generation circuit 134 through the signal line 131b to forward the WB command. The destination which the destination generation circuit generates is the home node, and the WB command is sent to the home node.

(4) Operations Complying with Access from Other Node

Here will be stated how the main memory access circuitry 130 operates in compliance with a command from any other node as sent thereinto through the network 900. In this regard, the operations complying with the D, DM and ND commands have already been stated in the item (3), and hence, the operations complying with the other commands F, FI, I and WB shall be stated. The command sent from the other node is checked by the network command check circuit 141, and is thereafter delivered to the network command classification circuit 142. The network command classification circuit 142 issues the command at a corresponding one of its outputs in accordance with the sort of the access command and with whether the accessed address is internal or remote (as judged by the "remote" decision circuit 147). Besides, in the case of the F, FI or I command, the access source node number thereof is set in the access source node number register 149.

(A) Case of F or FI Command toward Internal Address

The network command classification circuit 142 requests the bus command generation circuit 143 through a signal line 142d to generate a bus command. The bus command generation circuit 143 delivers the F or FI command to CPUs included in the particular node, through the shared bus 120 included in this node. Simultaneously, the network command classification circuit 142 requests the CCC holding circuit "B" (145) through a signal line 142c to hold the command delivered onto the shared bus included in the particular node.

Figure 15:
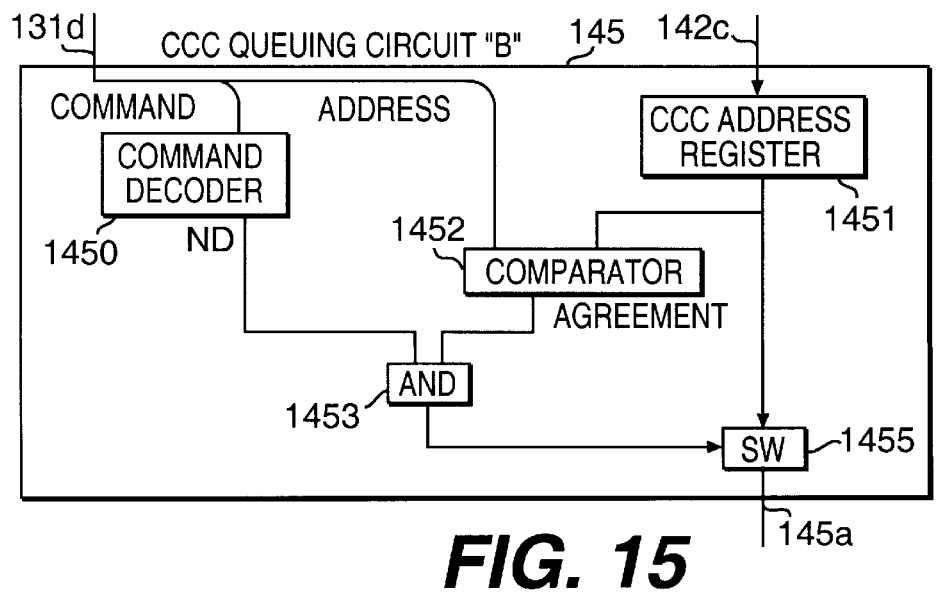
FIG. 15 is a block diagram of a CCC holding circuit "B" in each node.

FIG. 15 illustrates the details of the CCC holding circuit "B" (145). The address for the CCC as delivered through the signal line 142c is stored in a CCC address register 1451. Later, when the reply (D or ND command) to the CCC has come from the shared bus 120 within the node through the bus command reception/bus command classification circuit 131, it is first compared with the CCC address 1451 by a comparator 1452. On condition that the result of the comparison is agreement, if the command is the ND is judged by a command 1450 decoder and an AND gate 1453. In a case where the ND command has come in reply, the access address stored in the CCC address register 1451 is communicated to the main memory access circuit "B" 146 through a signal line 145a via a switch 1455, whereby the main memory access circuit "B" 146 is requested to access data stored in the main memory.

The result of the F or FI command issued to the shared bus within the node is returned either by the command D (in the presence of the corresponding data in the cache of any of the CPUs within the node) or by the command ND (in the absence of the corresponding data in the cache of the CPUs within the node). In the case of the D command, the data is simultaneously returned.

The bus command reception/bus command classification circuit 131 delivers the command at its corresponding output in accordance with the type of the command and with whether the access address is internal or remote (as decided by the "remote" decision circuit 132).

(Aa) Case where D command has been given in Reply to Access toward Internal address In the presence of the access data in the cache of the particular node, the bus command reception/bus command classification circuit 131 delivers the D command (command, address and data) to the network command generation circuit 134 through the signal line 131b. The network command generation circuit 134 returns the access data to the node of the access source by the use of the D command (the destination generation circuit 139 selects the access source node number 149). Thus, the data retained in the cache of the CPU of the particular node is sent to the node of the access source in reply.

(Ab) Case where ND command has been given in Reply to Access toward Internal address In the absence of the access data in the cache of the particular node, the bus command reception/bus command classification circuit 131 delivers the ND command to the CCC holding circuit "B" (145) through a signal line 131d. The CCC holding circuit "B" requests the main-memory access circuit "B" (146) through a signal line 145a to read out the content (cache line) of the access address as stored in the main memory 160. Upon reading out the access line through a signal line 160a, the main memory access circuit "B" (146) delivers it to the network command generation circuit 134 through a signal line 146*a*. The network command generation circuit 134 returns the access data to the node of the access source by the use of the DM command (the destination generation circuit 139 selects the access source node number 149).

Thus, the data stored in the main memory of the particular node is sent to the node of the access source in reply.

Figure 4:
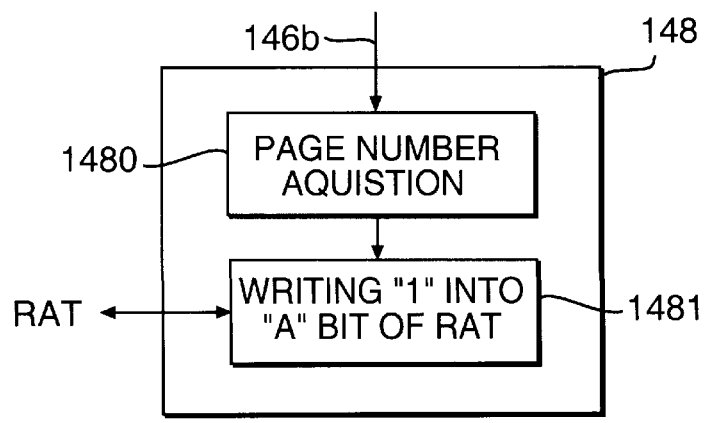
FIG. 4 is a block diagram of a RAT alteration circuit in each node.
Figure 5A:
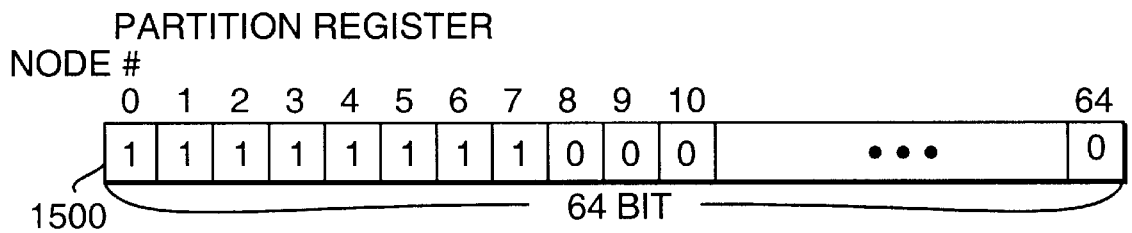
FIG. 5A is a bitmap which indicates a nodes belonging to a partition, included in partition/main memory configuration information.
Figure 5B:
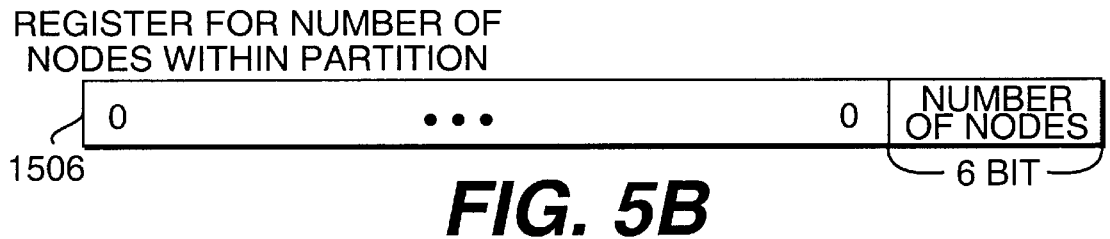
FIG. 5B is a register which expresses a number of a nodes included in a partition, included in partition/main memory configuration information.
Figure 5C:
FIG. 5C is a head address (base address) of the shared areas, included in partition/main memory configuration information.
Figure 5D:
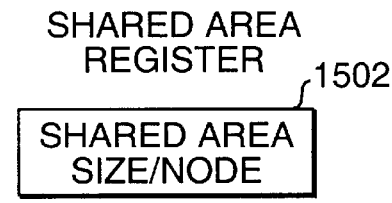
FIG. 5D is a size of a shared area per node, included in partition/main memory configuration information.
Figure 5E:
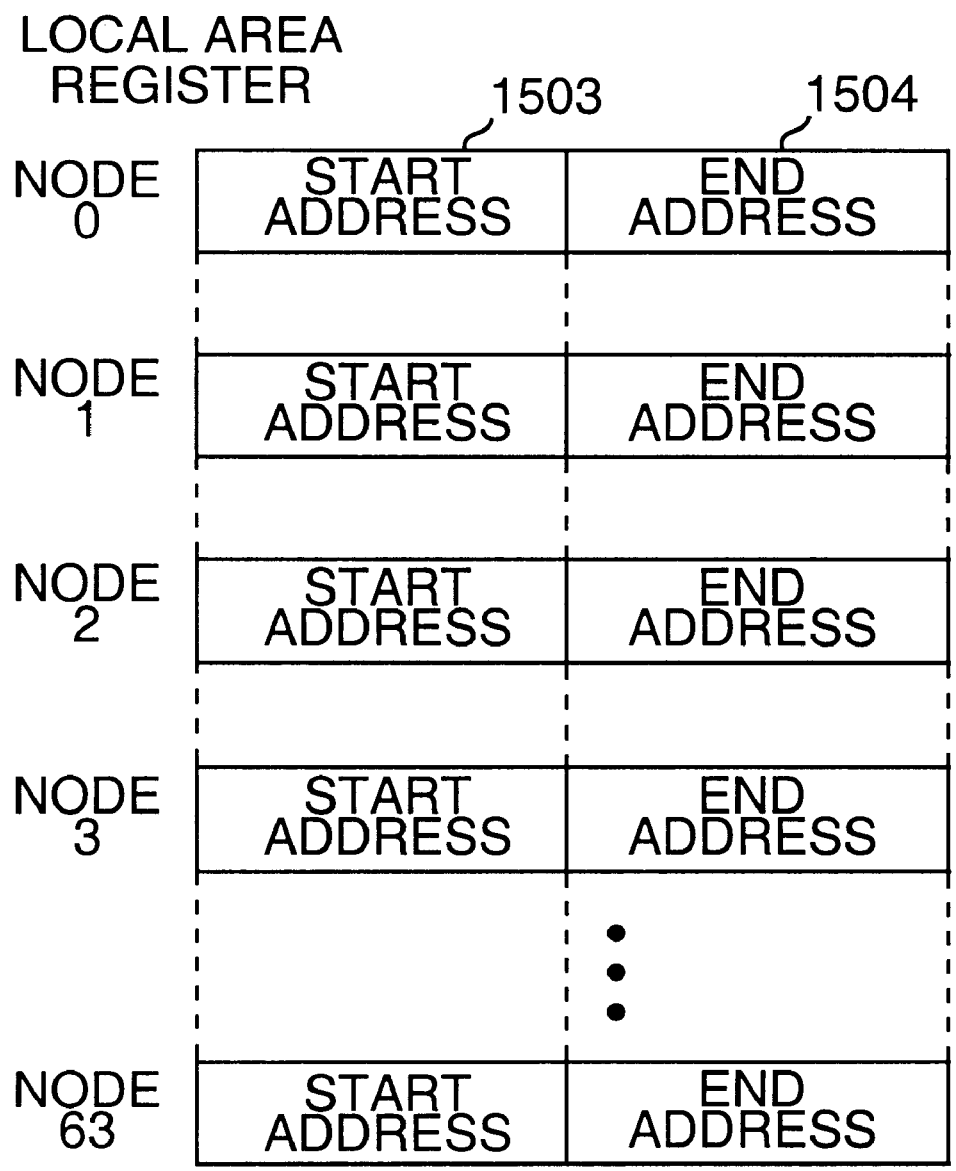
FIG. 5E is a start address and an end address of a local area as to each of nodes, included in partition/main memory configuration information.

Simultaneously, the main memory access circuit "B" (146) requests the RAT alteration circuit 148 through a signal line 146*b* to set "1" at that "A" bit of the RAT 138 which corresponds to the accessed page. FIG. 4 illustrates the details of the RAT alteration circuit 148. The RAT alteration circuit 148 comprises a circuit for page number acquisition (1480) and a circuit for writing "1" into "A" bit of RAT (1481). "1" is written into the "A" bit of the RAT which corresponds to the page number of the accessed address.

(B) Case of I Command toward Internal Address

The network command classification circuit 142 requests the bus command generation circuit 143 through the signal line 142*d* to generate a bus command. The bus command generation circuit 143 issues the I command to CPUs included in the particular node, through the shared bus 120 included in this node (there is no reply to the I command).

(C) Case of WB Command toward Internal Address

The network command classification circuit 142 requests the main memory access circuit "B" (146) through a signal line 142*b* to write written back data into the main memory. The main memory access circuit "B" (146) writes the written back data into the main memory 160 through the signal line 160*a*. Simultaneously, the main memory access circuit "B" (146) requests the RAT alteration circuit 148 through the signal line 146*b* to set "1" at that "A" bit of the RAT 138 which corresponds to the accessed page.

(D) Case of F or FI Command toward Remote Address

The network command classification circuit 142 requests the bus command generation circuit 143 through the signal line 142*d* to generate a bus command.

The bus command generation circuit 143 issues the F or FI command to CPUs included in the particular node, through the shared bus 120 included in this node. The result of the F or FI command issued to the shared bus within the node is returned by the command D (in the presence of the corresponding data in the cache of any of the CPUs within the node) or the command ND (in the absence of the corresponding data in the cache of the CPUs within the node). In the case of the D command, the data is simultaneously returned.

In either of the cases of the D and ND commands toward the remote addresses, the bus command reception/bus command classification circuit 131 transfers the D command (command, address, data) or the ND command (command, address) to the network command generation circuit 134 through the signal line 131*b*.

The network command generation circuit 134 returns the result of the access to the node of the access source by the use of the D or ND command (the destination generation circuit 139 selects the access source node number 149).

Thus, in the case of the D command, the data retained in the cache of the CPU of the particular node is sent to the node of the access source in reply, and in the case of the ND command, it is communicated that the corresponding data is inexistent in the cache of any of the CPUs of the particular node.

(E) Case of I command toward Remote address

In this case, quite the same operation as in the case (B) of the I command toward the internal address is carried out.

(F) Case of WB Command toward Remote Address

It is impossible that the WB command toward a remote address comes from any other node. The network command classification circuit 142 reports an error.

Owing to the steps thus far described, the cache coherency can be held among the nodes which are connected by the crossbar network.

On that occasion, the CCCs toward the other nodes can be reduced using the remote access table (RAT) 138.

Further, in dividing the interior of the shared memory multiprocessor into the partitions, the main memory is bisected into the local areas of each of the partitions and the areas shared among all the partitions, and the local areas are established as separate address spaces independent of one another among the partitions, whereby the addresses of each of the partitions can begin at address "0".

Still further, the partition/main memory configuration information 150 is stored using the registers, whereby the management of the partitions can be realized with a small amount of hardware.

MODIFICATIONS OF THE EMBODIMENTS

The present invention is not restricted to the foregoing aspect of performance, but it is also applicable to various modifications. Examples are as follows.

(1) Although the CPUs within the node are interconnected by the bus 120 in the foregoing, another connecting scheme (connections through switches, or direct connections to the main memory access circuitry 130) is also possible.

(2) Besides, although the RAT 148 is constructed of the dedicated memory built within the main memory access circuitry 130, in the foregoing, it can be constructed of an external memory. Further, the RAT can be physically placed in the local main memory 161. Moreover, on this occasion, the contents of the RAT can be cached in the main memory access circuitry 130.

(3) In the foregoing aspect of performance, as to the partition/main memory configuration information 150, the configuration information of the shared area is stored by the two registers of the shared area base address register 1501 and the shared area size/node register 1502.

It is also possible, however, to store the configuration information of the shared area as the pair of a start address and an end address for every node likewise to the local area register at numerals 1503 and 1504 (thus, the sizes of the shared areas of the individual nodes can be made unequal).

On this occasion, each of the shared memory decision circuit and the home node decision circuit which execute the computations by the use of the shared area base address register 1501 and the shared area size/node register 1502 in the foregoing aspect of performance can be constructed of multiple comparators.

(4) Although the respective CPUs (110~112) within the node have the independent caches in the foregoing, it is also possible to mount a secondary external cache which is shared among a plurality of CPUs.

It is also possible that the copy of the cache TAGs of the CPUs is held in the main memory access circuitry 130 of each node so as to filter a cache coherent transaction arriving from any other node.

(5) Although the nodes are interconnected by the crossbar network in the foregoing, they can also be interconnected by a network of different scheme (such as multistage network).

(6) In the foregoing aspect of performance, in issuing the network command to other nodes, broadcast or multicast is specified by designating destination nodes in terms of the bitmap. Broadcast or multicast, however, can also be incarnated in such a way that the network command generation circuit 134 issues a plurality of commands for every destination node.

According to the present invention, in a multiprocessor of shared memory type, a remote access table (RAT) is placed, whereby when a main memory included in a particular node is accessed, CCCs among nodes can be omitted for pages not accessed from the other nodes, by the addition of a small amount of hardware.

Accordingly, traffic to which the network among the nodes is subjected can be relieved while an access latency is shortened.

Further, according to the present invention, in dividing the interior of the shared memory multiprocessor into a plurality of partitions, the main memory is divided into the local areas of each of the partitions and areas shared among the partitions, and the local areas are established as the independent address spaces of the respective nodes, whereby the start address of each of the partitions can be set at address "0".

Further, the ranges of the local areas and shared areas of each partition are stored by registers, whereby the amount of hardware for partition management can be sharply reduced as compared with that for the page-sized management in the prior art.

We claim:

1. A multiprocessor having a plurality of nodes and a network for connecting the nodes, each of the nodes including at least one CPU, at least a cache and a memory, each of the nodes accessing the memories of all the nodes, at least one of the nodes comprising:

a first register, in correspondence with each page of the memory of one of the nodes, for storing a first bit showing if the corresponding page has been accessed from any other node, the first bit is set when the corresponding page of the memory has been accessed from the other of the nodes; and a circuit for, when the CPU of the one node accesses the memory of the particular node, checking the first bit of the first register that corresponds to the page to be accessed by the CPU of the one node, for sending a message managing the caches to the other nodes from the one node in a case where said first bit is set, and for inhibiting the sending of the message in a case where said first bit is not set.

2. A multiprocessor according to claim 1, wherein the first register is reset at initialization of the multiprocessor.

3. A multiprocessor according to claim 2, wherein, when software of the multiprocessor allocates a page of the memory, the bit of the first register corresponding to the page to be allocated is reset by the software.

4. A multiprocessor according to claim 1, wherein the first register differs from the memory.

5. A multiprocessor according to claim 1, the at least one node further comprising:

a second register, in correspondence with each page of the memory of the one node, for storing a second bit, in correspondence with each page of the memory, showing whether the sending of the message for the corresponding page to the other nodes is unnecessary, wherein when the CPU of the particular node accesses the memory of the particular node, the circuit checks the second bit for the page accessed from the CPU, sends the messages in accordance with a value of the first bit for the page accessed by the CPU in a case where the second bit for the page accessed from the CPU is not set, and inhibits the sending of the message to the other nodes in a case where said second bit for the page accessed from the CPU is set.

6. A multiprocessor according to claim 5, wherein the first register and the second register differ from the memory.

7. A multiprocessor comprising:

a plurality of nodes which can be divided into a plurality of partitions each including at least one node; and a network for connecting the nodes, each of the plurality of nodes comprising:

at least one processing element;

a memory which is divided into a first area which is accessible from all of the nodes and a second area which is accessible from the nodes within the corresponding partition;

a second circuit for storing a start address of the second area; and each of the plurality of nodes further comprising:

a circuit for storing distribution of the nodes within the partition to which each node belongs, in terms of a bitmap.

8. A multiprocessor comprising:

a plurality of nodes which can be divided into a plurality of partitions each including at least one node; and a network for connecting the nodes, at least one of the plurality of nodes comprising:

at least one processing element;

a cache;

a memory which is divided into a first area which is accessible from all of the nodes and a second area which is accessible from each of the nodes within the corresponding partition;

a circuit for deciding whether a processing element access is for the first area or for the second area; and a circuit for, when a first message controlling the caches is sent to other nodes, broadcasting the first message to all of the nodes within the multiprocessor in case of the access toward the first area and multicasting the first message to the nodes within the partition to which the one node belongs to in case of the access is to the second area.

9. A multiprocessor according to claim 8, the at least one node further comprising:

a circuit for deciding whether the access of a second message, which controls the caches and which is sent from a source node, is for the first area or for the second area;

a circuit for deciding whether the source node of the second message is within the partition to which the node that receives the second message belongs; and a circuit for inhibiting the access of the second message and for reporting an error when the access of the second message is for the second area and the source node of the second message is not within the partition.

10. A processor system having a plurality of processing units and a communication device for connecting the processing units, each of the processing units including at least one processor, a buffer memory and a main memory, each of the processing units accessing the main memories of all the processing units, at least one of the processing units comprising:

a table, in correspondence with each page of the main memory of one of the processing units, for storing a first bit showing if the corresponding page has been accessed from any other processing unit, the first bit being set by hardware when the corresponding page of the main memory has been accessed from the other processing unit; and a circuit for, when the processor of the one processing unit accesses the main memory of the one processing unit, checking the first bit of the table that corresponds to the page to be accessed from the processor of the one processing unit, for sending a command managing the caches to other processing units from the one processing unit in a case where said first bit is set, and for inhibiting the sending of the command in a case where said first bit is not set.

11. A multiprocessor comprising:

a plurality of nodes which can be divided into a plurality of partitions each including at least one node; and a network for connecting the nodes, at least one of the plurality of nodes comprising:
at least one processing element;
a cache;
a memory which is divided into a first area which is accessible from all of the nodes and a second area which is accessible from each of the nodes within the corresponding partition;

a first register, in correspondence with each page of the memory of the one node, for storing a first bit showing if the corresponding page has been accessed from any other node, the first bit being set when the corresponding page of the memory has been accessed from the other node;

a circuit for, when an access of the processing element of the one node is for the memory of the one node, checking the first bit of the first register that corresponds to the page to be accessed from the processing element of the one node, for sending a message controlling the caches to other nodes from the one node in a case where said first bit is set, and for inhibiting the sending of the message in a case where said first bit is not set; and a circuit for deciding whether the access to the memory is for the first area or of the second area, wherein the circuit for sending the message broadcasts the message to all of the nodes within the multiprocessor in case of the access of the first area and multicasts the message to the nodes within the partition to which the node belongs in case of the access of the second area.

* * * * *